United States Patent
Tran et al.

(10) Patent No.: US 12,511,822 B2
(45) Date of Patent: Dec. 30, 2025

(54) STREAMING LIGHTING INFORMATION FOR SYCHNONIZED SCENES FROM CLOUD-BASED SYSTEMS

(71) Applicant: NetEase Information Technology Corporation, Pasadena, CA (US)

(72) Inventors: Ray Tran, London (GB); John Elliot Meier, Bothell, WA (US); Brian Allen Neal, Los Angeles, CA (US); Ross Alan Gardner, Irvine, CA (US)

(73) Assignee: NetEase Information Technology Corporation, Pasadena, CO (US)

( * ) Notice: Subject to any disclaimer, the term of this patent is extended or adjusted under 35 U.S.C. 154(b) by 145 days.

(21) Appl. No.: 18/435,931

(22) Filed: Feb. 7, 2024

(65) Prior Publication Data

US 2025/0086887 A1    Mar. 13, 2025

Related U.S. Application Data

(63) Continuation-in-part of application No. 18/367,725, filed on Sep. 13, 2023.

(51) Int. Cl.
| | |
|---|---|
| *G06T 15/50* | (2011.01) |
| *G06T 1/20* | (2006.01) |
| *G06T 15/04* | (2011.01) |
| *G06T 15/06* | (2011.01) |
| *H04L 67/12* | (2022.01) |
| *H04L 67/131* | (2022.01) |
| *H04L 67/567* | (2022.01) |

(52) U.S. Cl.
CPC ............. *G06T 15/506* (2013.01); *G06T 1/20* (2013.01); *G06T 15/04* (2013.01); *G06T 15/06* (2013.01); *H04L 67/12* (2013.01); *H04L 67/131* (2022.05); *H04L 67/567* (2022.05)

(58) Field of Classification Search
CPC ......... G06T 15/506; G06T 15/04; G06T 1/20; G06T 15/06; G06T 2215/16; G06T 15/50; G06T 15/60; G06T 2215/12; G06F 3/0484
See application file for complete search history.

(56) References Cited

U.S. PATENT DOCUMENTS

| | | | |
|---|---|---|---|
| 2017/0178272 A1* | 6/2017 | Lashkari | .................. G06T 1/20 |
| 2020/0302684 A1* | 9/2020 | Sunkavalli | ............. G06V 20/20 |
| 2021/0279947 A1 | 9/2021 | Castaneda | |
| 2023/0177760 A1 | 6/2023 | Wahrenberg | |

* cited by examiner

*Primary Examiner* — Hau H Nguyen
(74) *Attorney, Agent, or Firm* — Hickman Becker Bingham Ledesma LLP

(57) ABSTRACT

Techniques are provided for sending a stream of lighting information for a synchronized scene from a cloud-based system to a set of synchronized client applications. Sending the stream includes detecting a series of changes in configuration of lighting for the synchronized scene, and after detecting each change in the series of changes (a) generating, at the cloud-based system, new lighting information that reflects the change; and (b) streaming the new lighting information to the set of synchronized client applications. Each client application in the set of synchronized client applications repeatedly renders updated depictions of the synchronized scene to reflect lighting configuration changes indicated in the stream of lighting information.

21 Claims, 6 Drawing Sheets

IMAGE 200

STREAMING LIGHTING INFORMATION FOR SYCHNONIZED SCENES FROM CLOUD-BASED SYSTEMS

CROSS-REFERENCE TO RELATED APPLICATIONS; BENEFIT CLAIM

This application claims the benefit as a Continuation-in-part of application Ser. No. 18/367,725, filed Sep. 13, 2023, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to generating digital depictions of virtual scenes and, more specifically, to generating high quality depictions of virtual scenes on devices with limited graphics processing capabilities.

BACKGROUND

Personal computers have significantly more computer resources than mobile devices. Not only do personal computers have larger screens than mobile devices, personal computers also tend to have more powerful CPUs and graphics processors, and more volatile and persistent storage. Consequently, it has been challenging for the makers of graphics-intensive mobile applications, such as games, to approximate the graphics quality exhibited by their personal computer counterparts.

One technique for improving the depiction of virtual scenes is referred to as "lightmapping". In lightmapping, the brightness and color of light that is reflected off surfaces in a virtual scene is pre-calculated and stored in texture maps. When the scene is rendered, the texture maps of the corresponding lightmap are applied to the scene, making the lighting in the depicted scene appear more realistic. For example, white light bounced off red walls of a virtual room will illuminate other objects in the room with a redish light. Similarly, application of a lightmap will cause shadows to appear at locations where objects are blocking a light source of a virtual scene. Additional information relating to lightmaps may be found at en.wikipedia.org/wiki/Lightmap, the content of which is incorporated herein by this reference.

Because mobile devices typically do not have the computational power to calculate scene-specific lightmaps on-the-fly, lightmaps are pre-calculated based on the static geometry of the scene to which they correspond. Use of pre-calculated lightmaps in a mobile application works well for relatively static scenes. However, issues arise when the depicted scene is subject to change. For example, if an object is removed from the scene, the pre-calculated lightmap no longer works properly since the object is no longer occluding light, and no light is bouncing off the removed object. Similar issues arise if the color of the objects in the room change, since that would affect the color of the light that is bouncing off the objects onto other objects within the scene.

It is possible to pre-calculate multiple lightmaps for the same scene, allowing the application to transition between pre-calculated lightmaps in response to changes that occur within the rendered scene. However, unless the number of supported changes is extremely limited, the number of pre-calculated lightmaps quickly becomes unmanageable. For example, given a scene with 19 configurable objects, each of which has 3 types/patterns and 8 possible colors, the number of pre-calculated lightmaps needed to support every possible combination would be astronomical ($(3 \times 8)^{19}$).

Another option for obtaining high-quality graphics in a mobile application is to use cloud-based computing resources to perform on-the-fly per-frame rendering of virtual scenes. Using this technique, for every image frame that is to be displayed on the device, a new high-quality image of the scene is generated using cloud-based computing resources, and then sent to the mobile application for display. Unfortunately, the cloud-based per-frame on-the-fly rendering approach of displaying a scene on a mobile device is extremely expensive given the computational demand placed on the cloud-based resources. For example, cloud-based per-frame on-the-fly rendering may require one or more dedicated cloud-based GPUs per mobile user, and popular mobile games may have tens of thousands of simultaneous users, or more.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
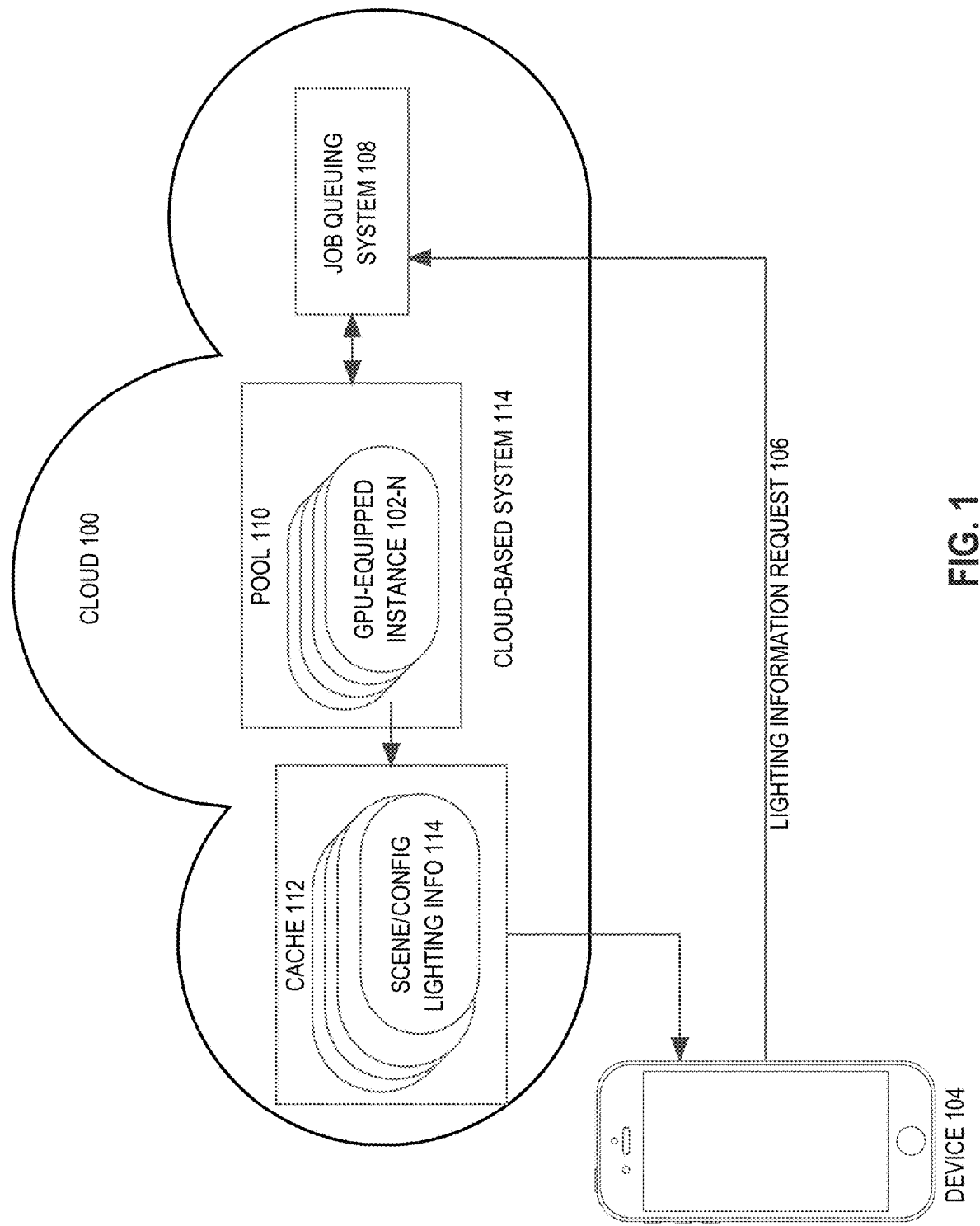
FIG. 1 is a block diagram of a system in which lighting information for specific scene/configuration combinations are generated by a cloud-based system and used by local devices to render high quality depictions of the scene/configuration, according to an implementation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To address the situation where local computing power is insufficient to perform on-the-fly per-frame rendering of virtual scenes, techniques are described herein for dividing the work involved in rendering a scene between the local device and a cloud-based system in a manner that leverages the computing power of both. Specifically, the client applications request per-scene/configuration lighting information from a cloud-based system, and the cloud-based system either generates the per-scene/configuration lighting information, or provides it from a cloud-based cache. Per-scene/configuration lighting information differs from per-frame images in that it includes only lighting information (and therefore involves far less data), and it needs only be regenerated when a configuration change occurs in a displayed scene (rather than every frame).

In one implementation of the cloud-based system described herein, cloud-based GPU-equipped instances are not dedicated to any particular local device. Instead, cloud-based GPU-equipped instances are maintained in a pool, where the pool may have significantly fewer GPU-equipped instances than the number of concurrently executing client application instances.

When a client application instance needs lighting information to be generated for a particular configuration of a particular scene ("target lighting information"), the local device sends a lighting information request for the target lighting information to the cloud-based system. Within the cloud-based system, a job queuing system responds to the lighting information request by assigning one or more GPU-equipped instances from the pool the task of generating the target lighting information. Upon completion of the task, the GPU-equipped instance(s) are returned to the pool, and the target lighting information is made available to the client application on the local device.

In some implementations, to avoid duplication of effort, the cloud-based system maintains a cache of the lighting information that it generates. When the cloud-based system receives a lighting information request from a client application instance on local device, the cloud-based system first determines whether the cache already has target lighting information specified in the request. If the target lighting information already exists in the cache, the previously generated target lighting information is made available to the requesting client application, without regenerating the same lighting information again.

While examples are given herein in a context where the client applications are mobile device games, the techniques described herein are not limited to that context. Rather, the techniques may be applied in any situation where any type of software application, running on any device, does not have sufficient computer power available to produce high-quality per-scene/configuration on-the-fly renderings of a scene. Thus, the techniques are equally applicable to applications running on older desktop computers and game consoles, as well as newer desktop computers and game consoles that have insufficient graphics capabilities.

Lighting Information

In one implementation, the lighting information that is generated using the techniques described herein are conventional lightmaps. However, conventional lightmaps are difficult to use on scenes involving dynamic objects such as characters. Therefore, in an alternative implementation, rather than use conventionally-rendered lightmaps, height-field cone tracing (HFCT) is combined with octahedral maps (light-field probes), as shall be described in greater detail hereafter.

Further information on the general topic of cone tracing can be found at en.wikipedia.org/wiki/Cone_tracing, the entire contents of which are incorporated herein by this reference.

Further information on a specific technique of HFCT can be found at advances.realtimerendering.com/s2012/CCP/Malan-Dust_514_GI_reflections(Siggraph2012).pptx, the entire contents of which is incorporated herein by this reference.

Further information on octahedral maps and light-field probes can be found at casual-effects.com/research/McGuire2017LightField/McGuire2017LightField-13DSlides.pdf and knarkowicz.wordpress.com/2014/04/16/octahedron-normal-vector-encoding/, the entire contents of each of which is incorporated herein by this reference.

According to one implementation, HFCT is combined with octahedral maps, where the octahedral maps are used to determine the occlusion for the HFCT. In such an embodiment, the lit height fields and the octahedral maps are, collectively, the lighting information produced on the cloud and used by the local device to render high quality images of virtual scenes.

Operational Overview

Referring to FIG. 1, it is a block diagram of a cloud-based system for rendering improved graphics on devices with limited graphics processing capabilities. Specifically, in FIG. 1, a mobile device 104 is executing a client application that depicts a virtual scene. Such an application may be, for example, a game running on a mobile phone.

When the client application needs to render a particular configuration of a virtual scene, the client application causes device 104 to send a lighting information request 106 to a cloud-based system 114 executing within cloud 100. In the implementation illustrated in FIG. 1, the lighting information request is sent to a job queueing system 108 that is part of cloud-based system 114.

While FIG. 1 illustrates a single client device 104, cloud-based system 114 may be used to provide lighting information to concurrently executing client applications on thousands of such devices. Preferably, requests from all such devices are received by job queueing system 108, which itself may be distributed and parallelized. Job queueing system 108 may process the lighting information requests in an order based on rules. As a simple example, the order may be first-in-first-out (FIFO) based on the times at which the requests are received. Alternatively, the order may be based on additional criteria, such as priority of service, the specific scenes for which lighting information is requested, whether the lighting information is cached, etc.

When job queueing system 108 determines that it is time to process lighting information request 106, cloud-based system 114 may first determine whether the request 106 is for lighting information that already resides in a cloud-based cache 112. Cloud-based cache 112 may be implemented in a variety of ways. For example, cloud-based cache 112 may be implemented as a file-based flat storage system, or a more sophisticated Content Delivery Network (CDN) byte transfer download system. The techniques described herein are not limited to any particular cache implementation.

In the illustrated implementation, cache 112 contains scene/configuration-specific lighting information 114 for many scene/configuration combinations. If the request is for lighting information that already resides in cache 112, cloud-based system 114 causes device 104 to download the requested lighting information from cache 112. For example, cloud-based system 114 may send to device 104 a message that includes information that uniquely identifies scene/ configuration-specific lighting information 114. Device 104 may use the information to download the scene/configuration-specific lighting information 114 from cloud 100.

On the other hand, if the request 106 is for scene/configuration-specific lighting information that does not currently reside in cache 112, then job queueing system 108 assigns one or more GPU-equipped instances 102N, from pool 110, to the task of generating the requested scene/configuration-specific lighting information. After the GPU-equipped instance(s) 102 complete the task of generating the requested scene/configuration-specific lighting information, the target scene/configuration-specific lighting information is stored in cache 112, and cloud-based system 114 causes the target scene/configuration-specific lighting information to be downloaded to device 104.

The GPU-equipped instance(s) 102 are then returned back to pool 110. Once returned to pool 110, the GPU-equipped instance(s) 102 may be assigned another task. For example, the GPU-equipped instance(s) may be subsequently assigned the task of generating scene/configuration-specific lighting information for a subsequent request from the same client application, or for a request from a client application running on any other client device.

Once device 104 downloads the target scene/configuration-specific lighting information, the client application uses the scene/configuration-specific lighting information to render a high-quality depiction of the target configuration of a virtual scene. Use of this same scene/configuration-specific lighting information may continue until the user of the client application performs some action that requires depiction of a different virtual scene, or alters the configuration of the currently depicted scene. If the change of scene or configuration requires lighting information that is not already available on the device 104, then the device 104 sends a subsequent lighting information request to cloud-based system 114, and the process described above is repeated.

Flow of Client Application Operation

Figure 5:
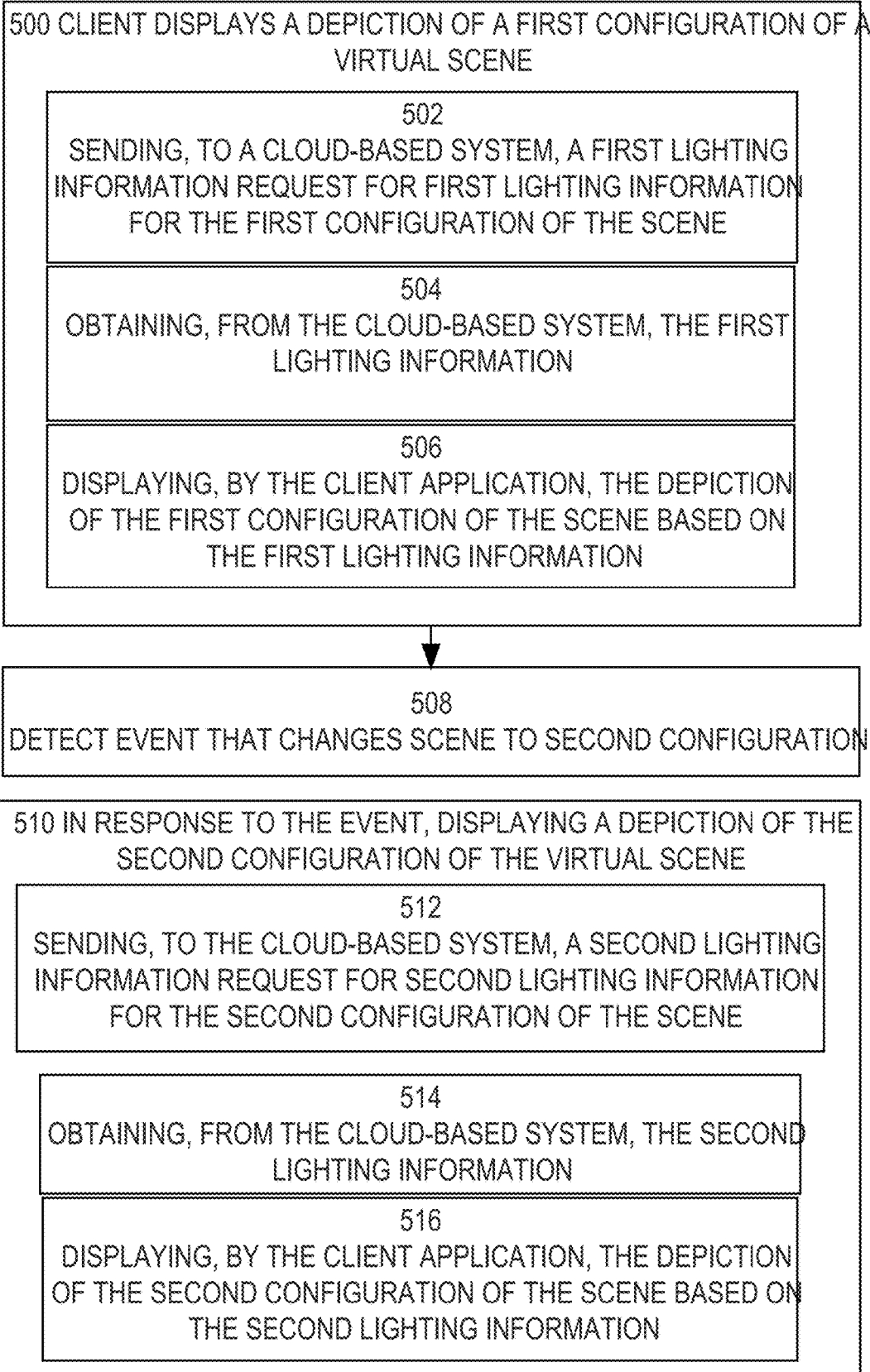
FIG. 5 is a flowchart illustrating steps for generating displays of virtual scenes as the configuration of such scenes changes, according to an implementation.

FIG. 5 is a flow diagram of the operation of a client application according to one implementation. Referring to FIG. 5, the client displays a depiction of a first depiction of a virtual scene at step 500, detects an event that changes the virtual scene to a second configuration (step 508), and then depicts the virtual scene in the second configuration (step 510). However, because the client application may be running on a device with insufficient graphics capabilities, the client application offloads a significant amount of the rendering work to the cloud-based system. In particular, as illustrated in steps 502 and 504, the client application requests and receives lighting information for the first configuration of the scene from the cloud-based system. Consequently, in step 506, the client application displays the first configuration of the scene based on the lighting information thus received.

Similarly, in response to the configuration change in the scene, in steps 512 and 514 the client application requests and receives lighting information for the second configuration of the scene from the cloud-based system. Consequently, in step 516, the client application displays the second configuration of the scene based on the lighting information received from the cloud-based system in response to the second request.

Covering for Delays

Because the client application offloads the generation of lighting information to the cloud-based system, there is a round-trip of communication between the client application and the cloud-based system when an event causes the configuration of a virtual scene to change. This round-trip, combined with the time required for the cloud-based system to generate the needed lighting information, may result in a non-trivial delay.

According to one implementation, the client application may use any one of a variety of techniques to cover for this delay so that when a scene needs to be re-rendered. For example, to cover for the delay, the client application can use a visual effect to mask the loading time (e.g., a fade in/fade out, a pixelated swirling visual effect where the scene appears disassembled and reassembled, etc.) The techniques described herein are not limited to any particular technique for covering for the delay between re-rendering a scene in response to configuration changes.

Checking the Cache

As mentioned above, before generating the lighting information that is requested by a client application, cloud-based system 114 first determines whether the requested lighting information already exists in cache 112. Cloud-based system 114 may make this determination immediately upon receipt of a lighting information request, or when job queueing system 108 determines that it is time to process the request.

In one implementation, cloud-based system 114 uses a key mechanism to determine whether requests are for scene/configuration-specific lighting information 114 that is already in cache 112. For example, a unique key may be generated for each unique scene/configuration combination for which lighting information is generated. When scene/configuration-specific lighting information is stored in cache 112 for a given scene/configuration combination, the key for that scene/configuration combination may be stored in a data structure (such as a table or index) in conjunction with the location of the corresponding scene/configuration-specific lighting information.

Each lighting information request may include the unique key for the scene/configuration combination for which lighting information is requested. Alternatively, the request may include information from which cloud-based system 114 is able to derive the corresponding key. Once the key associated with a request is obtained, cloud-based system 114 determines whether the requested scene/configuration-specific lighting information is already in cache 112 by searching the data structure for an entry that corresponds to the key contained in each request.

In embodiments that use such a data structure is used to track the scene/configurations for which lighting information has been cached, cloud-based system 114 keeps the data structure in sync with the contents of cache 112. For example, if the lighting information for some scene/configuration combinations is deleted from cache 112 to free up space, then cloud-based system 114 updates the data structure to remove any entries associated that correspond to the deleted scene/configuration combinations.

Local Rendering of the Scene

Once the client application receives from cloud-based system 114 the lighting information needed to produce a high-quality rendering of a particular configuration of a scene/configuration, the client application renders the scene/configuration based on the lighting information thus obtained using the hardware available on the local device 104.

Figure 2:
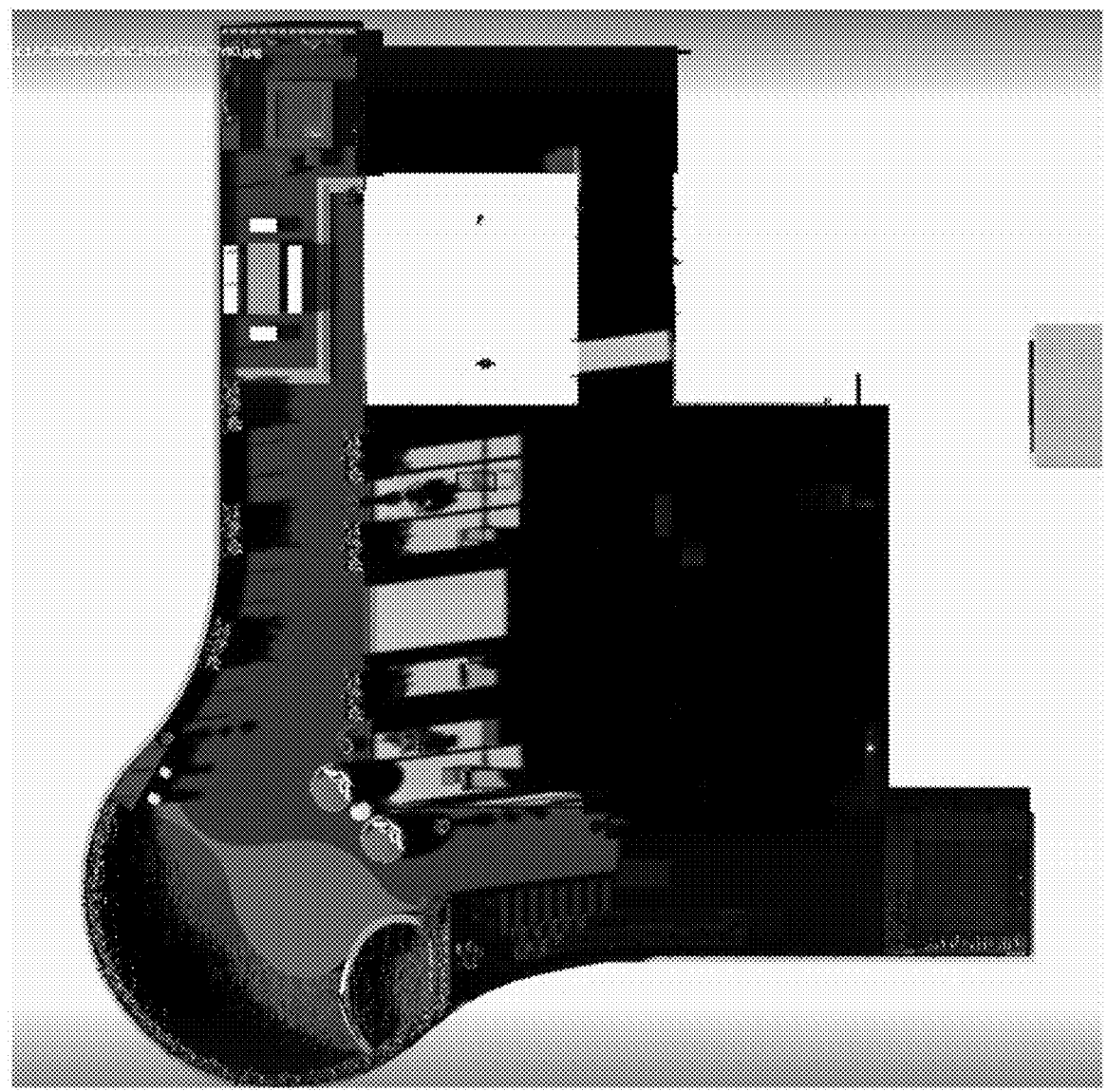
FIG. 2 is a block diagram of an image, generated by a cloud-based system, containing "from above" lighting information for a particular scene/configuration combination, according to an implementation.
Figure 3:
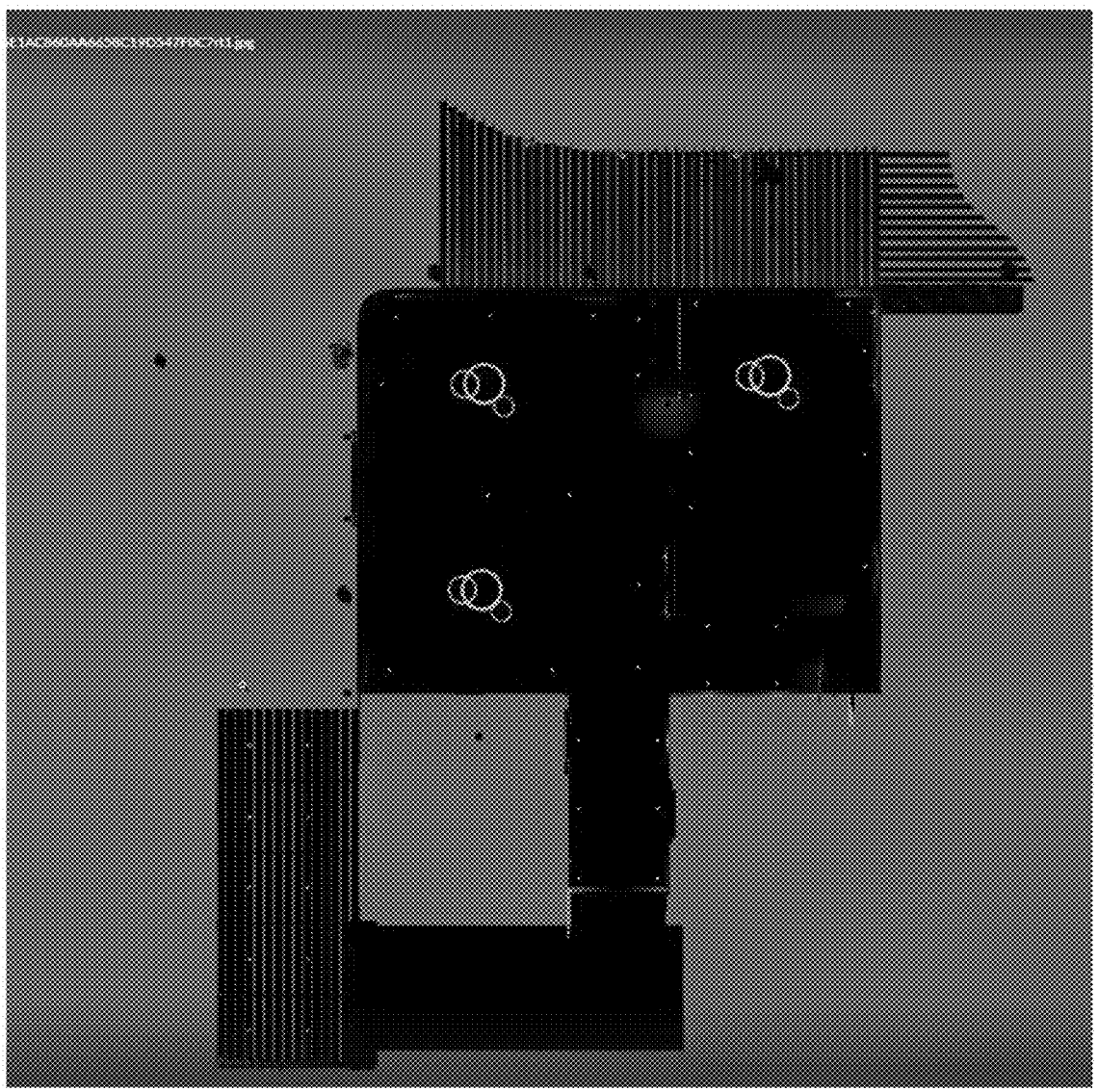
FIG. 3 is a block diagram of an image, generated by a cloud-based system, containing "from below" lighting information for the particular scene/configuration combination, according to an implementation.

In one implementation, the lighting information takes the form of lit height fields (images) and octahedral occlusion data. Referring to FIG. 2, it illustrates an image 200 (lit height field), generated by cloud-based system 114, that contains lighting information (global illumination data) for a particular configuration of a particular scene of a virtual environment. The lighting information generated by cloud-based system 114 may contain several such images for a particular scene/configuration combination, based on the number of layers supported by the client application. For example, image 200 reflects a particular scene/configuration combination lit from above, while image 300 in FIG. 3 illustrates the same particular scene/configuration combination lit from below. The lighting information for that particular scene/configuration combination may include both images 200 and 300.

The global illumination data reflects shadows, light bouncing off surfaces in the particular configuration of the particular scene, the colors of such reflected light, etc. The files for images 200 and 300 may also include buffers containing data that is not directly visible in images 200 and 300. For example, the files may include buffers containing octahedral maps that represent octahedral occlusion data.

The images 200 and 300 and their corresponding octahedral occlusion data will typically comprise far less data than conventional lightmaps and associated reflection maps and light probes (where the density of the light probes generally must be high to achieve good results). Thus, the transmission of images 200 and 300 between cloud-based system 114 and device 104 generates less traffic than would occur if the lighting information included conventional lightmaps/reflection maps/light probes. In one implementation, traffic is further reduced by compressing the lighting information prior to transmission of the lighting information from cloud-based system 114 to device 104. Reducing the amount of data exchanged between the cloud and local devices also reduces the latency between when a scene/configuration changes and when the client device's display reflects the scene/configuration change.

Within device 104, the lit height fields and octahedral occlusion data are passed into a shader which executes by combining the lit height fields with the octahedral occlusion data to generate a high quality image of the scene. The height-field cone tracing is then performed using a current height and a filtered height of its surroundings. Based on the current height and filtered height, the shader determines where, on the lit height field, the shader should sample.

Using cone sampling, the sample itself is an area which simulates a cone of samples. Based on this information, the shader running on device 104 is able to determine the irradiance that is coming in from a certain cone angle. The HFCT technique incorporated above is an example of a sampling algorithm that may be used by the shader executing on device 104. The shader may then scale back the contribution based on the corresponding occlusion, which is worked out from the octahedral occlusion data obtained from cloud-based system 114.

Cloud/Local Division of Work

Using the techniques described herein, the work associated with rendering a high-quality depiction of a virtual scene is split between local hardware and the cloud-based system. Specifically, the cloud-based system is responsible for generating the lighting information for each scene/configuration combination. The local hardware, on the other hand, is responsible for generating a high-quality depiction of the scene, on a frame-by-frame basis, based on that lighting information. Because the cloud-based system does not have to be called on a frame-by-frame basis, the communication traffic between the local devices and the cloud-based system 114 is significantly reduced, as is the cost of the cloud-based resources and the latency between rendered frames. On the other hand, the local device 104 is not asked to perform graphics manipulation that exceeds the capabilities of its hardware, while still being able to render high quality depictions of virtual scenes.

In the implementations discussed above, cloud-based system 114 is responsible for generating all of the lighting information, while device 104 renders the depiction of a scene/configuration combination based on that lighting information. However, in alternative implementations, the local hardware of device 104 may be responsible for generating at least some of the lighting information for a scene/configuration combination.

For example, in one implementation, cloud-based system 114 may generate the lighting information for a particular scene/configuration combination that includes a particular set of light sources. A user may perform an action that adds an additional light source (e.g. turn on a light in a virtual scene). Rather than cause cloud-based system 114 to generate a new set of lighting information in response to this change, device 104 may render the new light source directly into the lit height field of the existing lighting information (without requesting a new set of lighting information from cloud-based system 114). However, while it may be useful to allow the hardware of device 104 to directly generate some lighting information in this manner, involving device 104 too heavily in the generation of global lighting information will tax the graphical resources of device 104, and may result in unacceptably low frame rates, for example.

Cloud-Based On-the-Fly Rendering Vs Pre-Generation

In some cases, it is most efficient to perform cloud-based on-the-fly rendering of the lighting information for a particular configuration of a virtual scene. In other cases, it may be more efficient to pre-generate the lighting information for a configuration of a scene, and cache it in the cloud or locally.

An example of a scenario where cloud-based on-the-fly rendering of lighting information may be preferable is where the scene is of an apartment. There may be so many permutations and ways a player can change/remove furniture or other aspects of the apartment that it is not feasible to pre-compute all the lighting information for all these permutations. Consequently, the lighting information generation is performed on-the-fly as a player updates the scene.

In contrast, examples of where it may be more efficient for the lighting information to be rendered in the cloud in advance, and then cached locally, are scenes in which there are relatively few dynamic changes in lighting. In such scenarios, the lighting information for the relatively few configurations may be pre-computed on the cloud and then stored locally. An example of this would be pre-computing lighting for various times of day/night. In such a scenario, only four different sets of lighting information may be needed to represent the different lighting configurations of a scene throughout the day. These four sets of lighting information could be pre-computed and cached locally.

Streaming Cloud-Generated Lighting Information

In the preceding sections, implementations have been described in which GPU-equipped instances (102-1 to 102-N) of cloud-based system 114 generate lighting information for applications running on client devices in response to lighting-information requests from those applications. Providing client-specific lighting information in response to such client-specific lighting information requests makes sense when each client application is potentially displaying a different scene/configuration combination than the scene/configuration combinations being shown by every other client application. However, in some situations, the scene/configuration combinations of multiple clients may be in sync. Under those circumstances, the lighting information for that scene/configuration combination (the "synchronized scene") may be automatically streamed to the devices that are executing the client applications that are displaying the synchronized scene (the "synchronized set of client applications").

An example of a scenario involving a synchronized scene is a virtual "nightclub", where multiple users are allowed to be in the same instance of the nightclub. A user is considered "in" an instance of the nightclub if the user's client application is currently displaying a view of the instance of the nightclub. In the nightclub example, the synchronized scene is the instance of the nightclub, and the synchronized set of client applications is the set of client applications associated with the users that are currently in that instance of the nightclub.

In one implementation, the lighting information for the shared instance of the nightclub is streamed to the client applications of all users that are currently in the shared instance of the nightclub scene. Though the delivery protocol is different (streaming/broadcasting rather than client-request-triggered), the lighting information that is streamed for a synchronized scene may contain the same type of lighting information as the lighting information that is sent by cloud-based system 114 in response to the lighting information requests of client applications. In addition, the actually rendering of the scene, based on the streamed lighting information, may be performed by the client applications in the same manner as described above.

Because the lighting information is streamed without waiting for client-initiated lighting information requests, each client application in the synchronized set receives the same lighting information at approximately the same time, and therefore all users in the instance of the synchronized scene have the same lighting experience as other users in the same nightclub instance at the same time. For example, as the color and angles of lights within the virtual nightclub change (as is common in real-life nightclubs), all users in the virtual nightclub will see the same changes of colors and angles.

In one implementation, all lighting-configuration-changing events are initiated at the cloud-based system 114. Specifically, the cloud-based system 114 may include one or more servers that are responsible for managing a particular instance of the nightclub scene. Those servers may determine, for example, the timing and type of lighting-configuration changes that occur in the instance of the nightclub scene. As in real-life nightclubs, the timing of such changes may be synchronized with the beat/content of music that is also being streamed to the set of synchronized client applications. In response to each of those changes, one or more of the GPU-instances receive information about the lighting changes and generate the new lighting information for the instance of the nightclub scene. The new lighting information, when generated, is streamed (potentially along with the music) to the synchronized set of client applications for that instance of the nightclub scene.

In another implementation, lighting-configuration-changing events for a synchronized scene may be initiated by client applications. For example, a user that is in an instance of a nightclub may be presented with a control panel that controls the lighting in the synchronized nightclub instance. In response to user input on that control panel, information about the user's interactions may be sent from the application client of the user to the cloud-based system. In response to each of the lighting-changing events, one or more of the GPU-instances generate new lighting information for the instance of the nightclub scene. The new lighting information, when generated, is streamed to the synchronized set of client applications for that instance of the nightclub scene.

In some cases, lighting-configuration-changing events may be initiated by multiple client applications in the synchronized set of client applications. For example, every user that is in an instance of a nightclub may be allowed to affect the lighting of the nightclub (e.g. by interacting with control panels, light switches, etc.). Information about all such events may be sent from the application clients to the cloud-based system 114, where they may be consolidated with each other and with any server-initiated lighting-configuration-changing events. In response to the consolidated lighting-configuration-changing event information, one or more of the GPU-instances generate new lighting information for the instance of the nightclub scene. The new lighting information, when generated, is streamed to the synchronized set of client applications for that instance of the nightclub scene.

As mentioned above, in one implementation, the cloud-based system combines server-initiated lighting-configuration-changing events with client-application-initiated lighting-configuration-changing events. For example, while a sequence of lighting-changing events for an instance of a nightclub is being initiated at a server within cloud-based system 114, the user of a synchronized client application may perform an action that turns on a light within the instance of the nightclub. The user-initiated event is communicated to the cloud-based system 114, and one or more GPU-equipped instances generate new lighting information that takes into account both the server-initiated light-changing events, and the client-application-initiated light-changing event (of turning on the light). The lighting information thus generated is streamed to the synchronized client applications.

Figure 6:
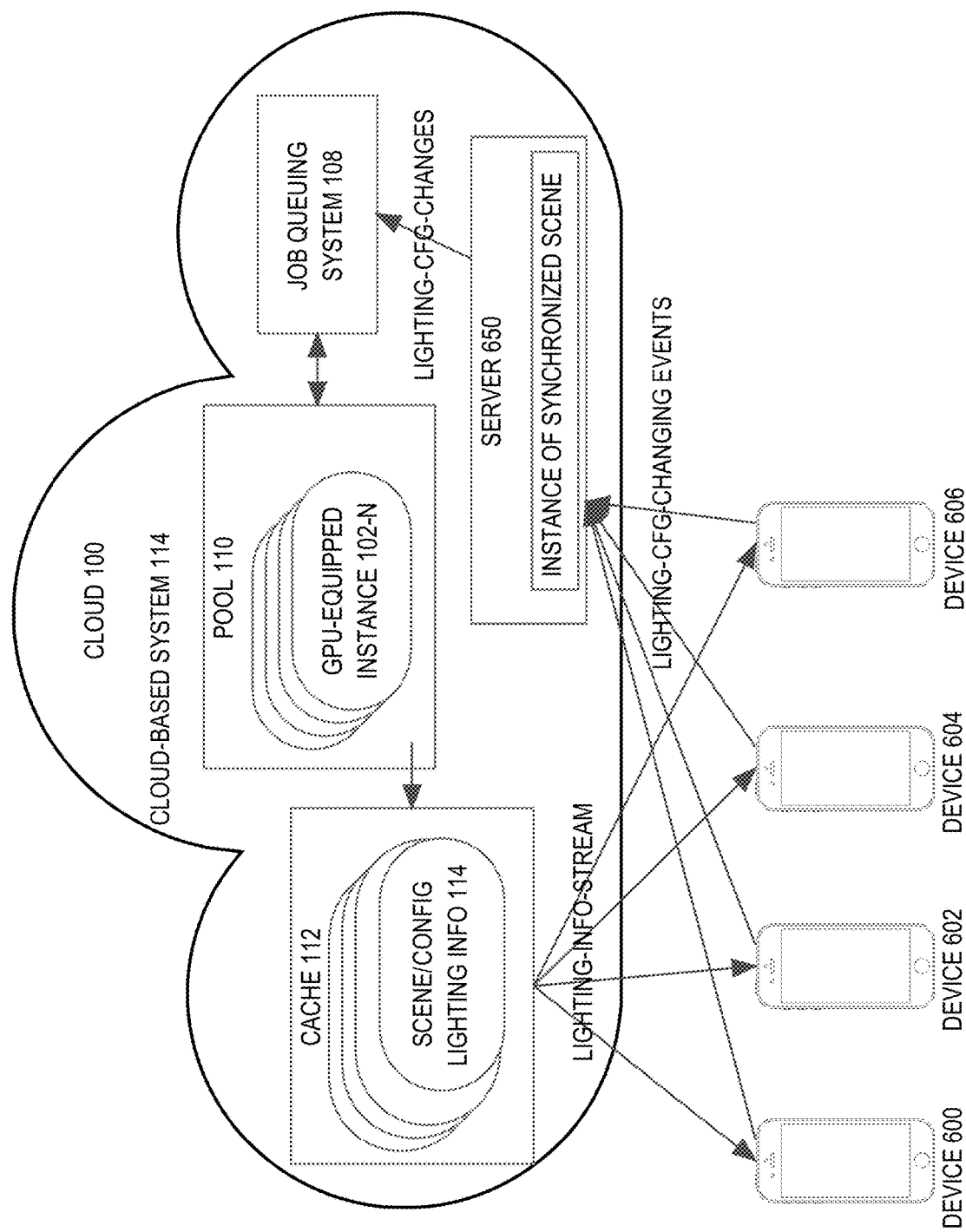
FIG. 6 is a block diagram of system 100 adapted to support the streaming of cloud-based lighting information for a synchronized scene.

FIG. 6 is a block diagram of system 100 adapted to support the streaming of cloud-based lighting information for a synchronized scene. Referring to FIG. 6, a server 650 within cloud-based system 114 is executing an instance of a synchronized scene. For the purpose of explanation, it shall be assumed that the synchronized scene is a virtual nightclub, within which a light show is changing in sync with music. Information about the lighting configuration changes that occur within the virtual night club as a result of the light show are sent by server 650 to job queueing system 108. Based on the information about lighting configuration changes, GPU-equipped instances from pool 110 are used to generate the lighting information that corresponds to the lighting configuration changes. Once generated, those changes are streamed to the synchronized set of client applications, without waiting for the client applications to request the lighting information from the cloud-based system 114. To ensure that lighting changes occur in sync with the music, the same stream that is used to send the lighting information to the synchronized set of client applications may be used to stream the audio information for the music to the synchronized set of client applications.

In the example illustrated in FIG. 6, the synchronized set of client applications includes client applications running on devices 600, 602, 604 and 606. As additional users enter that particular instance of the virtual nightclub, their client applications are added to the synchronized set of client applications to which the lighting information for the instance is streamed. Conversely, as users exit the instance of the virtual nightclub, their client applications are removed from the synchronized set, causing their client application to cease to receive the streamed lighting information for that instance of the virtual nightclub.

In the illustrated implementation, server 650 is configured to receive client-initiated lighting-configuration-changing events from each client application in the synchronized set of client applications. Such events may indicate, for example, that a user interacted with the instance of the virtual nightclub in a manner that affects the lighting within the nightclub, such as:

- interacting with a control on a virtual control panel,
- turning on or off a light in the virtual nightclub,
- changing the angle of a light in the virtual nightclub
- changing the color of paint on a wall of the virtual nightclub
- moving virtual furniture in a way that blocks or unblocks a light source in the virtual The number of and type of user actions that may trigger client-initiated lighting-configuration-changing events is virtually unlimited. Hence, the techniques described herein are not limited to any particular type of client-initiated lighting-configuration-changing events.

In the implementation illustrated in FIG. 6, the lighting-information-streaming process for synchronized scenes makes use of the same cloud-based components that are used to provide lighting information in response to client-initiated lighting information requests (e.g. lighting information request 106 in FIG. 1). Specifically, server 650 sends lighting configuration changes for its instance of the synchronized scene to job queueing system 108, job queueing system 108 arranges for one or more GPU-equipped instances in the pool 110 to generating the new lighting information for the instance of the synchronized scene, and the lighting information is stored in cache 112 as it is streamed to the synchronized set of client applications. However, in alternative implementations, the streaming process may use separate components for some or all of these actions.

For example, a separate set of GPU-equipped instances may be dedicated to the task of generating lighting information for synchronized scenes. This would be the case, for example, if one or more GPUs on server 650 were used to generate lighting information for all instances of synchronized scenes that are managed by server 650. As another example, the lighting information for synchronized scenes may use a separate cloud-based cache than the cache used for client-specific lighting-information requests. Alternatively, the lighting information for synchronized scenes may be streamed without being stored in any cloud-based cache.

The ability to perform lighting-configuration-changing actions may be restricted to a subset of client applications in the synchronized set of client applications. For example, only users having a particular status or role may be allowed to turn on/off the lights in the virtual nightclub. In yet other implementations, client-initiated lighting-configuration changing events may not be supported at all. In such an implementation, all changes to the lighting configuration of an instance of a synchronized scene may be initiated by the server responsible for that instance of the synchronized scene (e.g. server 650). Such an implementation would avoid the need to combine lighting configuration changes initiated by client applications with lighting configuration changes being made at the server 650.

In one implementation, the same stream of lighting information may be used for multiple instances of the same synchronized scene. For example, assume that ten users are in a first instance of a nightclub, and that fifteen other users are in a second instance of the same nightclub. In this scenario, the cloud-based system 114 may generate a single stream of lighting information for both instances of the nightclub. That single stream may be sent from the cloud-based system 114 to the client applications of all 24 users. Thus, all 24 users would experience the same light show (and optionally the same synchronized music), even though those users are split between multiple instances of the nightclub. In this same manner, the a single stream of lighting information may be generated for all instances of any given scene, where the client applications connected to any newly created instances of the scene are automatically added to the synchronized set of client applications that receive that same stream of lighting information.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
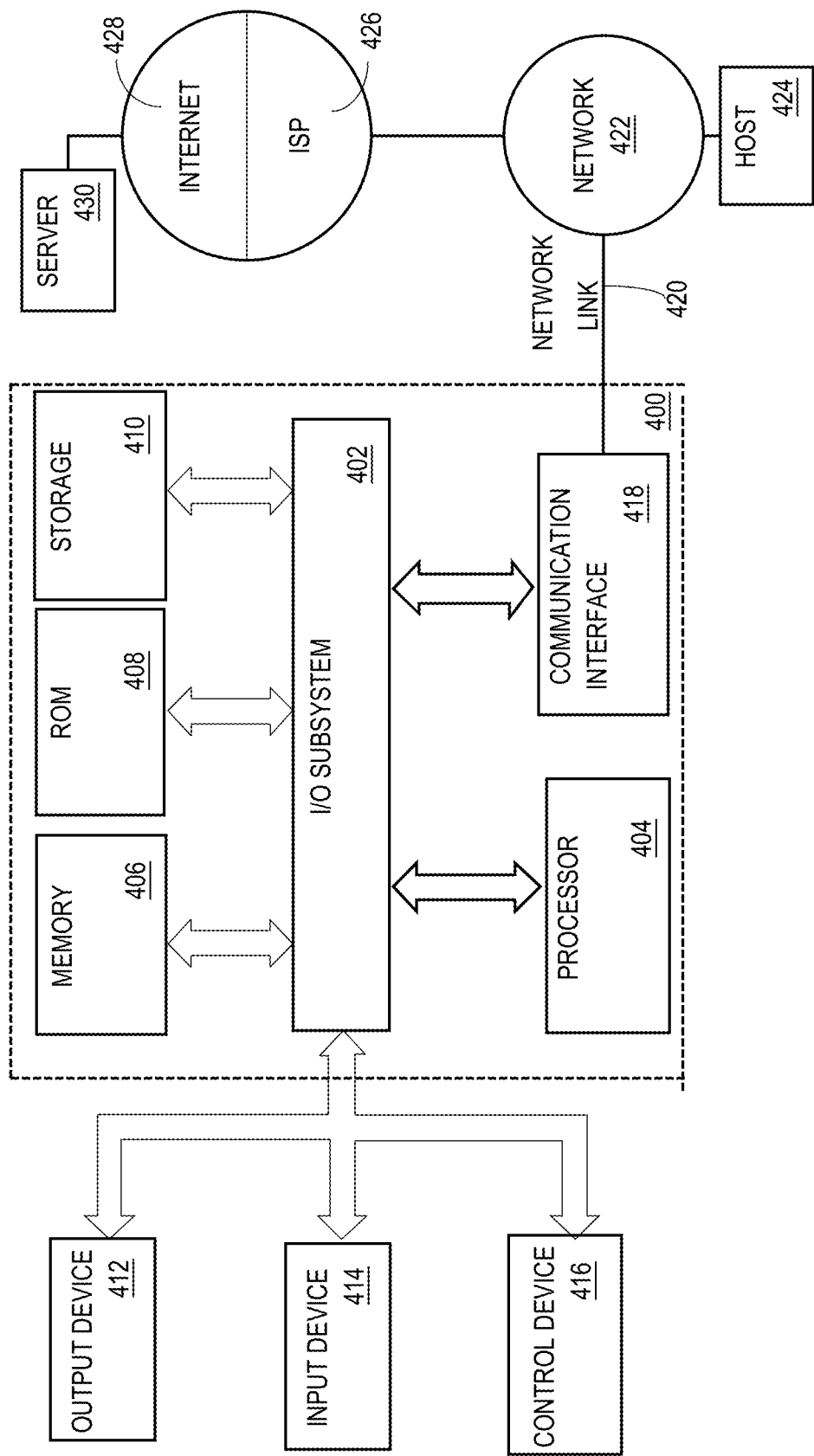
FIG. 4 is a block diagram of a computing device upon which the techniques described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   implementing, on a cloud-based system, a virtual environment;
   causing a plurality of client applications, operatively coupled to the cloud-based system, to render scenes from the virtual environment;
   wherein the virtual environment includes a first instance of a synchronized scene;
   tracking, by the cloud-based system, which client applications of the plurality of client applications belong to a particular set of synchronized client applications associated with the synchronized scene;
   wherein the particular set of synchronized client applications includes client applications, from the plurality of client applications, that are being used by users that are in the first instance of the synchronized scene;
   sending a stream of lighting information for the synchronized scene from the cloud-based system to the particular set of synchronized client applications;
   wherein sending the stream of lighting information includes:
      detecting a series of changes in configuration of lighting for the synchronized scene; and
      after detecting each change in the series of changes:
         generating, at the cloud-based system, new lighting information that reflects the change; and
         streaming the new lighting information to the particular set of synchronized client applications; and
   causing each client application in the particular set of synchronized client applications to repeatedly render updated depictions of the synchronized scene to reflect lighting configuration changes indicated in the stream of lighting information received by the client application from the cloud-based system.

2. The method of claim 1 further comprising:
   detecting that a user of a particular client application, of the plurality of client applications, has entered the first instance of the synchronized scene;
   in response to detecting that the user has entered the first instance, the cloud-based system adding the particular client application to the particular set of synchronized client applications; and
   in response to the particular client application being added to the particular set of synchronized client applications, the cloud-based system commencing to send the stream of lighting information for the synchronized scene to the particular client application.

3. The method of claim 1 further comprising:
   detecting that a user of a particular client application, of the plurality of client applications, has exited the first instance of the synchronized scene;
   in response to detecting that the user has exited the first instance, the cloud-based system removing the particular client application from the particular set of synchronized client applications; and
   in response to the particular client application being removed from the particular set of synchronized client applications, the cloud-based system ceasing to stream the lighting information for the synchronized scene to the particular client application.

4. The method of claim 1 wherein:
   the first instance of the synchronized scene is one of a plurality of instances of the synchronized scene; and
   the set of synchronized client applications includes all client applications, from the plurality of client applications, that are being used by users that are in any instance, of the plurality of instances, of the synchronized scene.

5. The method of claim 1 wherein:
   the first instance of the synchronized scene is one of a plurality of instances of the synchronized scene; and
   the set of synchronized client applications includes only those client applications, from the plurality of client applications, that are being used by users that are in the first instance of the synchronized scene.

6. The method of claim 5 wherein:
   the stream of lighting information reflects lighting changes that are specific to the first instance of the synchronized scene; and
   the method further comprises:
      tracking, by the cloud-based system, which client applications of the plurality of client applications are being used by users that are in a second instance of the synchronized scene; and
      while sending the stream of lighting information to the particular set of synchronized client applications, the cloud-based system sending a different stream of lighting information for the second instance of the synchronized scene to the client applications that are being used by users that are in the second instance of the synchronized scene.

7. The method of claim 1 wherein:
   at least some changes in the series of changes are synchronized with audio; and
   the stream sent by the cloud-based system to the particular set of synchronized client applications includes, in addition to the lighting information, audio information for the audio with which the lighting configuration changes are synchronized.

8. The method of claim 7 wherein the synchronized scene is a virtual nightclub and the audio is music.

9. The method of claim 1 wherein detecting the series of changes includes detecting changes caused by server-initiated lighting-configuration-changing events.

10. The method of claim 1 wherein:
   detecting the series of changes includes detecting changes caused by client-application-initiated lighting-configuration-changing events; and the method further comprises receiving, at the cloud-based system, information about the client-application-initiated lighting-configuration-changing events from one or more client applications in the particular set of synchronized client applications.

11. The method of claim 1 wherein detecting the series of changes includes detecting both:
   changes caused by server-initiated lighting-configuration-changing events, and
   changes caused by client-application-initiated lighting-configuration-changing events.

12. The method of claim 1 wherein generating new lighting information is performed by one or more GPU-instances within the cloud-based system.

13. The method of claim 12 wherein repeatedly rendering updated depictions of the synchronized scene is performed using height-field cone tracing.

14. The method of claim 12 wherein the stream of lighting information includes information about lit height fields and octahedral occlusion data.

15. The method of claim 12 wherein the stream of lighting information includes lightmaps.

16. One or more non-transitory computer-readable media storing instructions which, when executed, cause:
   implementing, on a cloud-based system, a virtual environment;
   causing a plurality of client applications, operatively coupled to the cloud-based system, to render scenes from the virtual environment;
   wherein the virtual environment includes a first instance of a synchronized scene;
   tracking, by the cloud-based system, which client applications of the plurality of client applications belong to a particular set of synchronized client applications associated with the synchronized scene;
   wherein the particular set of synchronized client applications includes client applications, from the plurality of client applications, that are being used by users that are in the first instance of the synchronized scene;
   sending a stream of lighting information for the synchronized scene from the cloud-based system to the particular set of synchronized client applications;
   wherein sending the stream of lighting information includes:
      detecting a series of changes in configuration of lighting for the synchronized scene; and
      after detecting each change in the series of changes:
         generating, at the cloud-based system, new lighting information that reflects the change; and
         streaming the new lighting information to the particular set of synchronized client applications; and
   causing each client application in the particular set of synchronized client applications to repeatedly render updated depictions of the synchronized scene to reflect lighting configuration changes indicated in the stream of lighting information received by the client application from the cloud-based system.

17. The one or more non-transitory computer-readable media of claim 16 wherein:
   the first instance of the synchronized scene is one of a plurality of instances of the synchronized scene; and
   the set of synchronized client applications includes only those client applications, from the plurality of client applications, that are being used by users that are in the first instance of the synchronized scene.

18. The one or more non-transitory computer-readable media of claim 17 wherein:
   the stream of lighting information reflects lighting changes that are specific to the first instance of the synchronized scene; and
   the instructions include instructions for:
      tracking, by the cloud-based system, which client applications of the plurality of client applications are being used by users that are in a second instance of the synchronized scene; and
      while sending the stream of lighting information to the particular set of synchronized client applications, the cloud-based system sending a different stream of lighting information for the second instance of the synchronized scene to the client applications that are being used by users that are in the second instance of the synchronized scene.

19. The one or more non-transitory computer-readable media of claim 16 wherein:
   at least some changes in the series of changes are synchronized with audio; and
   the stream sent by the cloud-based system to the particular set of synchronized client applications includes, in addition to the lighting information, audio information for the audio with which the lighting configuration changes are synchronized.

20. The one or more non-transitory computer-readable media of claim 16 wherein detecting the series of changes includes detecting both:
   changes caused by server-initiated lighting-configuration-changing events, and
   changes caused by client-application-initiated lighting-configuration-changing events.

21. The one or more non-transitory computer-readable media of claim 16 wherein generating new lighting information is performed by one or more GPU-instances within the cloud-based system.

* * * * *